No. 680,753.  
B. F. BERKLEY.  
GATE.  
(Application filed May 7, 1901.)  
Patented Aug. 20, 1901.
(No Model.)
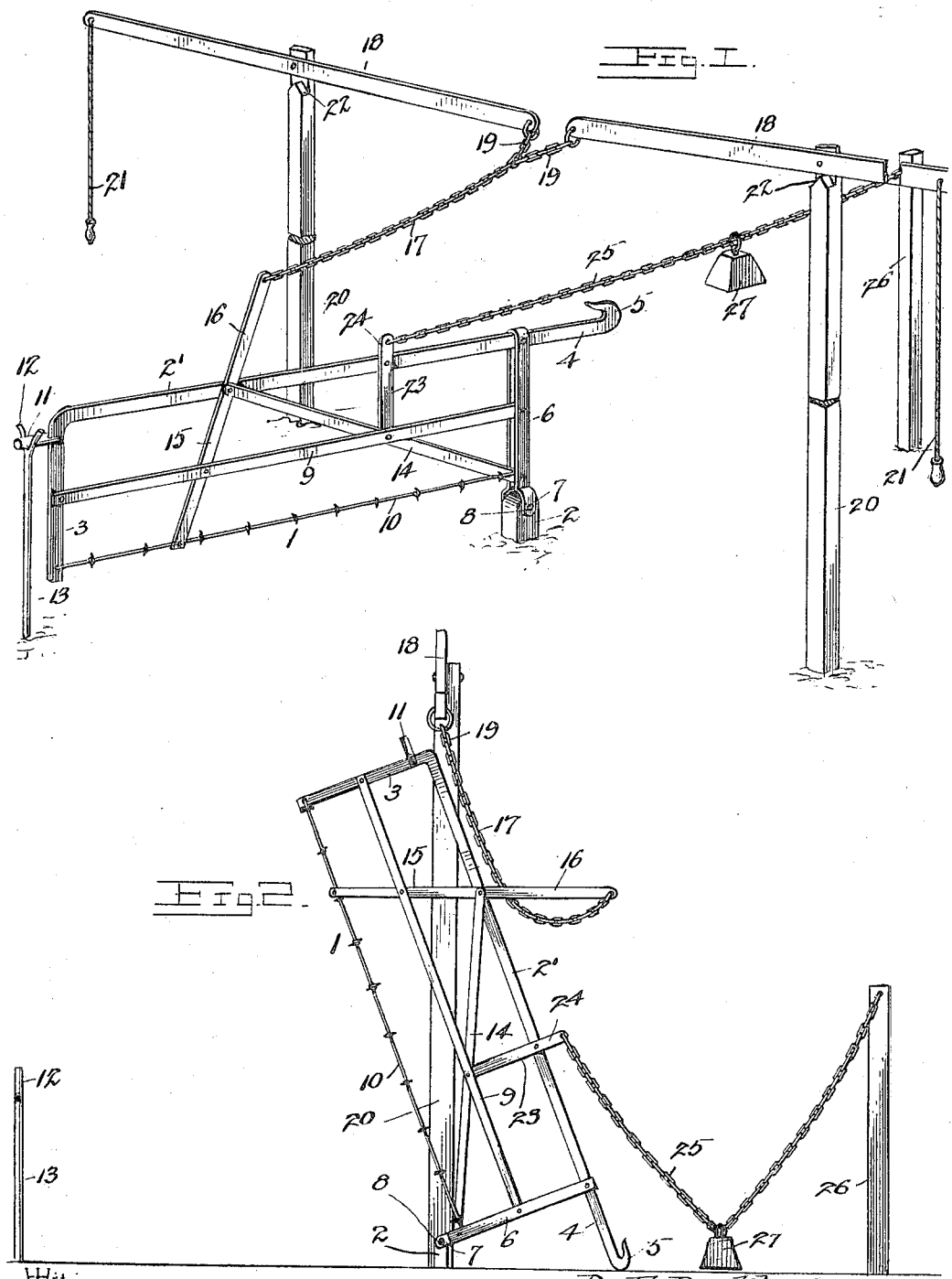
Witnesses  
F. E. Alden  
H. J. Riley
B. F. Berkley, Inventor  
by C. A. Snow & Co  
Attorneys

UNITED STATES PATENT OFFICE.

BENJAMIN FRANKLIN BERKLEY, OF ACTON, TEXAS.

GATE.

SPECIFICATION forming part of Letters Patent No. 680,753, dated August 20, 1901.

Application filed May 7, 1901. Serial No. 59,150. (No model.)

*To all whom it may concern:*

Be it known that I, BENJAMIN FRANKLIN BERKLEY, a citizen of the United States, residing at Acton, in the county of Hood and State of Texas, have invented a new and useful Gate, of which the following is a specification.

The invention relates to improvements in gates.

The object of the present invention is to improve the construction of tilting gates and to provide a simple, inexpensive, and efficient one of great strength and durability adapted to be readily opened and closed at a distance from either side of it by a person in a vehicle or on horseback.

The invention consists in the construction and novel combination and arrangement of parts hereinafter fully described, illustrated in the accompanying drawings, and pointed out in the claims hereto appended.

In the drawings, Figure 1 is a perspective view of a gate constructed in accordance with this invention. Fig. 2 is a side elevation of the same, the gate being open.

Like numerals of reference designate corresponding parts in both figures of the drawings.

1 designates a gate pivoted at its rear end to a short post or support and adapted to be swung upward and downward and back and forth from the positions illustrated in the drawings to open and close it and preferably constructed of metal; but a gate of any other desired construction may be employed, if desired. The gate is provided with a top bar 2, formed integral with a front end bar 3 and provided with a rearwardly-extending arm 4, adapted when the gate is swung upward to the position illustrated in Fig. 2 to rest upon the ground and support the gate. This arm 4, which limits the backward movement of the gate, has its outer or rear end 5 bent upward upon itself to form an enlarged rounded portion to rest upon the ground. The rear portion of the top bar 2 is riveted or otherwise secured to a rear end bar 6, which is doubled centrally to form two sides, and the lower terminals 7 of the sides are curved or bent outward to form a fork for straddling the post or support 2. The forked ends 7 of the sides of the rear end bar 6 are perforated for the reception of a pivot 8, which forms the pintle of the gate. The rear end bar, which receives the top bar 2, also receives the rear end of an intermediate bar 9, which is suitably secured to the front end bar. The front and rear end bars are connected at the bottom of the gate by a barbed wire 10. The barbed wire 10, which may be secured to the end bars of the gate by any suitable means, is adapted to prevent animals from getting under and lifting the gate.

The front of the gate is provided with an arm 11, which when the gate is closed rests in a fork 12 of a latch-post 13, and the said arm is adapted to be readily lifted out of engagement with the fork, which has diverging sides adapted to guide the arm into the crotch of the fork. The gate is also supported by an inclined brace 14, extending upward from the bottom of its rear or pivoted end to the top bar 2, and it is secured to the latter and to a bar 15, which inclines upward and rearward, being extended above the top of the gate to form an arm 16. The arm 16 is connected by a chain 17 or other suitable connection with the inner adjacent ends of a pair of operating-levers 18, the chain 17 being provided at its upper or rear end with branches 19, as clearly illustrated in Fig. 1 of the accompanying drawings.

The operating-levers 18, which are fulcrumed between their ends on suitable uprights 20, are provided at their outer ends with depending ropes 21, having suitable handles or grips and adapted to be readily grasped to draw the outer ends of the operating-levers downward to swing the gate from either of the positions shown in the drawings. When the gate is open, the arm 16 extends rearward and enables the operating-levers to exert a sufficient throw to insure the closing of the gate. The uprights, which may be constructed in any suitable manner, are preferably recessed at their upper ends to receive the operating-levers, and the shoulders formed by recessing the uprights are oppositely beveled, as shown at 22, to permit the necessary movement of the levers.

The gate is provided at its rear portion with a short vertical bar 23, secured to the horizontal bars 2 and 9 and to the inclined brace and projecting above the gate to form a short arm 24, which is connected to the front end of a chain 25 or other suitable flexible connection. The chain 25 extends rearward from the short arm 24 to a post 26 and is provided between its ends with a weight 27, adapted to partially counterbalance the weight of the gate to enable the same to be readily swung in either direction. The post 26 and the uprights 20 may be connected by suitable braces to form a solid structure, and these braces may be arranged in any suitable manner.

It will be seen that the gate is exceedingly simple and inexpensive in construction, that it possesses great strength and durability, and that it is adapted to be readily opened and closed at a distance from either side of it. It will also be apparent that the rearwardly-extending arm supports the gate in an inclined position, so that but slight movement of the operating-levers will be required to close it, and that the counterbalancing-weight will resist the closing movement and prevent the gate from being injured by contact with the latch-post. Furthermore, it will be clear that the barbed wire at the bottom of the gate will prevent animals from crawling under it and will also keep them from lifting the gate.

What I claim is—

1. The combination of a gate pivoted at its bottom and provided with a rearwardly-extending arm and having an upwardly-extending arm located between its ends and projecting from the top of the gate, a post located in rear of the gate, a flexible connection extending from the post to the gate at a point between the ends thereof and provided between its ends with a weight, operating-levers fulcrumed at opposite sides of the gate, and a flexible connection extending from the levers to the upwardly-extending arm of the gate, substantially as described.

2. The combination with a short post or support, of a gate comprising the top bar having its rear end extended to form an arm, the front bar connected at its upper end to the top bar, the rear end bar provided with two sides having their lower ends forked and pivoted to the short post or support, an intermediate horizontal bar connecting the end bars, the inclined brace 14 extending upward from the rear end of the gate, the bar 15 extending above the gate to form an arm, the barbed wire located at the bottom of the gate, and the short vertical bar 23, a flexible connection extending rearward from the short bar 23 and provided with a weight, and operating mechanism connected with the upwardly-extending arm, substantially as described.

In testimony that I claim the foregoing as my own I have hereto affixed my signature in the presence of two witnesses.

BENJAMIN FRANKLIN BERKLEY.

Witnesses:
ARON ELDMER BROWNING,
ABNER THORNTON KEITH.